US008433454B2

(12) United States Patent
Boudreau

(10) Patent No.: US 8,433,454 B2
(45) Date of Patent: Apr. 30, 2013

(54) METHOD AND SYSTEM FOR MODIFYING OPERATION ACCORDING TO DETECTED ORIENTATION

(75) Inventor: Jeffrey M. Boudreau, Warwick, RI (US)

(73) Assignee: Acumentrics Corporation, Westwood, MA (US)

( * ) Notice: Subject to any disclaimer, the term of this patent is extended or adjusted under 35 U.S.C. 154(b) by 261 days.

(21) Appl. No.: 12/972,937

(22) Filed: Dec. 20, 2010

(65) Prior Publication Data

US 2011/0184589 A1 Jul. 28, 2011

Related U.S. Application Data

(60) Provisional application No. 61/298,321, filed on Jan. 26, 2010.

(51) Int. Cl.
*G06F 7/00* (2006.01)
(52) U.S. Cl.
USPC .............................. 701/1; 701/34.4; 701/36
(58) Field of Classification Search ................ 701/1, 36, 701/99, 34.4
See application file for complete search history.

(56) References Cited

U.S. PATENT DOCUMENTS

| | | | |
|---|---|---|---|
| 5,267,709 A | 12/1993 | Koharcheck et al. | |
| 6,209,910 B1 | 4/2001 | Nagae | |
| 6,218,738 B1 | 4/2001 | Fujishima | |
| 6,392,556 B2 | 5/2002 | Tomich | |
| 6,563,234 B2 * | 5/2003 | Hasegawa et al. | 307/66 |
| 6,584,388 B2 | 6/2003 | Schubert et al. | |
| 6,794,849 B2 * | 9/2004 | Mori et al. | 320/107 |
| 7,148,586 B2 * | 12/2006 | Lee et al. | 307/65 |
| 7,421,321 B2 * | 9/2008 | Breed et al. | 701/33.6 |
| 7,497,118 B2 | 3/2009 | Ploechinger | |
| 7,688,031 B2 | 3/2010 | Asakura et al. | |
| 7,786,623 B2 | 8/2010 | Farmer et al. | |
| 8,159,186 B2 * | 4/2012 | Iida et al. | 320/132 |
| 8,265,022 B2 * | 9/2012 | Hans | 370/329 |
| 2001/0012211 A1 * | 8/2001 | Hasegawa et al. | 363/131 |
| 2002/0156553 A1 * | 10/2002 | Read | 701/1 |
| 2003/0137277 A1 * | 7/2003 | Mori et al. | 320/132 |
| 2003/0152145 A1 * | 8/2003 | Kawakita | 375/240.12 |
| 2007/0051001 A1 | 3/2007 | Hasegawa et al. | |
| 2008/0278314 A1 * | 11/2008 | Miller et al. | 340/539.13 |
| 2009/0139781 A1 | 6/2009 | Straubel | |
| 2010/0117375 A1 * | 5/2010 | Kwok | 290/1 R |

\* cited by examiner

*Primary Examiner* — Russell Frejd
(74) *Attorney, Agent, or Firm* — Preti Flaherty Beliveau & Pachios, LLP

(57) ABSTRACT

An uninterruptible power supply (UPS) mountable within a vehicle receives input power and produces a first output in response to the received input power even in the absence of the input power. A detector is coupled to the UPS and detects a situation parameter associated with the vehicle and/or the UPS. The detected situation parameter is either an incline angle relative to a reference plane, an applied force, an acceleration or a vibration. The first output of the UPS is then modified as a function of the detected situation parameter with respect to either a threshold value or a range of values.

20 Claims, 3 Drawing Sheets

METHOD AND SYSTEM FOR MODIFYING OPERATION ACCORDING TO DETECTED ORIENTATION

RELATED APPLICATIONS

This application is a non-provisional application claiming priority from U.S. Provisional Patent Application Ser. No. 61/298,321 for "Method and System for Modifying Operation According to Detected Orientation," filed Jan. 26, 2010, and which is incorporated by reference herein for all purposes.

STATEMENT REGARDING FEDERALLY SPONSORED RESEARCH OR DEVELOPMENT

N/A

BACKGROUND OF THE INVENTION

Many systems in operation today, especially mobile systems such as automobiles, buses, trucks, planes, trains, etc., are susceptible to disruptions of their normal operating orientation. These disruptions may be due to changes in conditions, e.g., weather, icy roads, wind, etc., in the case of cars and trucks or collisions with other vehicles due to operator error, weather conditions or intentional malevolent actions. As a result of these changes in orientation, for example, a vehicle being knocked on its side, it may become necessary to alter some aspect of operation of the vehicle or system incorporated in the vehicle in response to the abnormal orientation condition. The altered operation may be necessary in order to protect either the occupants or others from danger.

Thus, for example, a vehicle using a power supply or an uninterruptible power supply as part of its operation may need the power supply to shut off if the vehicle were to roll over or, otherwise end up in a dangerous and/or nonoperational orientation. One can understand that a vehicle lying on its side, with a normally operating generator within, could present a dangerous situation to the occupants or to any rescue personnel who arrive on the scene.

What is needed, therefore, is a system that will be able to modify one or more aspects of the operation of a vehicle system in response to the detection of a specific orientation or an abnormal acceleration, for example, due to a shock or force.

BRIEF SUMMARY OF THE INVENTION

In one embodiment of the present invention, a system for mounting within a vehicle includes an uninterruptible power supply (UPS) that receives input power and produces a first output in response to the received input power even in the absence of the input power. A detector is coupled to the UPS and/or the vehicle and detects at least one situation parameter associated with at least one of the vehicle and the UPS. The detected situation parameter is either an incline angle relative to a reference plane, an applied force, an acceleration or a vibration. The first output of the UPS is then modified as a function of the detected situation parameter.

The modification of the first output of the UPS is determined by a relationship between the detected situation parameter and a parameter threshold value and/or a range of parameter threshold values.

BRIEF DESCRIPTION OF THE SEVERAL VIEWS OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention.

DETAILED DESCRIPTION OF THE INVENTION

U.S. Provisional Patent Application Ser. No. 61/298,321 for "Method and System for Modifying Operation According to Detected Orientation," filed Jan. 26, 2010, is incorporated by reference herein for all purposes.

In accordance with one embodiment of the present invention, the power output from a power supply or uninterruptible power source may be either shut down completely or the power output reduced when the orientation, or tilt, of the device is detected as being out of an expected range of operation or when an excessive shock and/or vibrational forces have been detected. It has been noted that mobile applications, i.e., systems that are expected to be moving during normal operation, are susceptible to dangerous operating conditions when the orientation of a normally operating system is altered or the vehicle is subject to shock or vibration.

It should be noted that the concepts and embodiments to be described herein are readily applicable to many types of power systems including, but not limited to, uninterruptible power supplies, generators, batteries, solar generators, wind generators and capacitors. Further, while a mobile system, for example, a truck or vehicle, may be described, one of ordinary skill will understand that the concepts herein are equally applicable to other types of vehicles such as ships, trains, planes, tracked vehicles or construction equipment. Embodiments of the present invention are applicable where a significant roll, inversion, vibration or shock, i.e., a situation parameter, might present a dangerous situation to occupants, power sources, bystanders, or others. Still further, systems located on "stationary" equipment may also benefit from application of the teachings herein.

Figure 1:
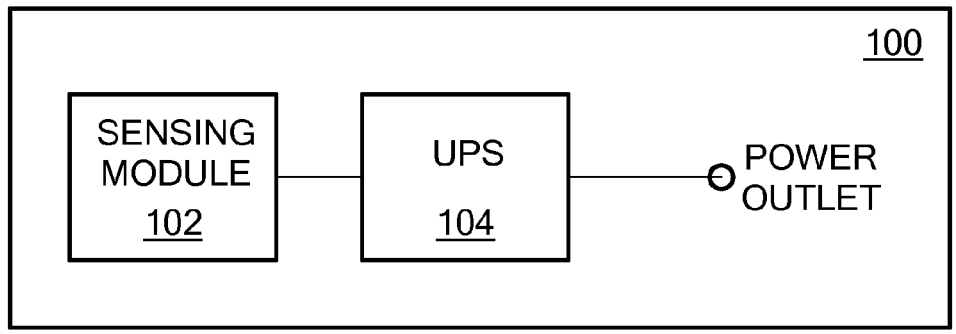
FIG. 1 is a block diagram of one embodiment of the present invention; In the figures.

Referring now to FIG. 1, a system 100, e.g., a vehicle such as a truck, includes a sensing module 102 coupled to an uninterruptible power supply (UPS) 104. Generally, a UPS functions to provide better regulated, i.e., "cleaner," power than that which might be provided directly from the output of a generator and will continue to provide power to a load for a limited period of time from a secondary power source even when the primary power input to the UPS becomes inactive. Those systems that need precise voltages, with "clean" characteristics, usually use a UPS. The sensing module 102 monitors the orientation of the UPS 104 and/or the vehicle 100 and the forces or shocks experienced by the vehicle 100 and/or the UPS 104 and, as will be discussed in more detail below, alters the operation of the UPS 104 in accordance with the detected orientation and forces.

Figure 2:
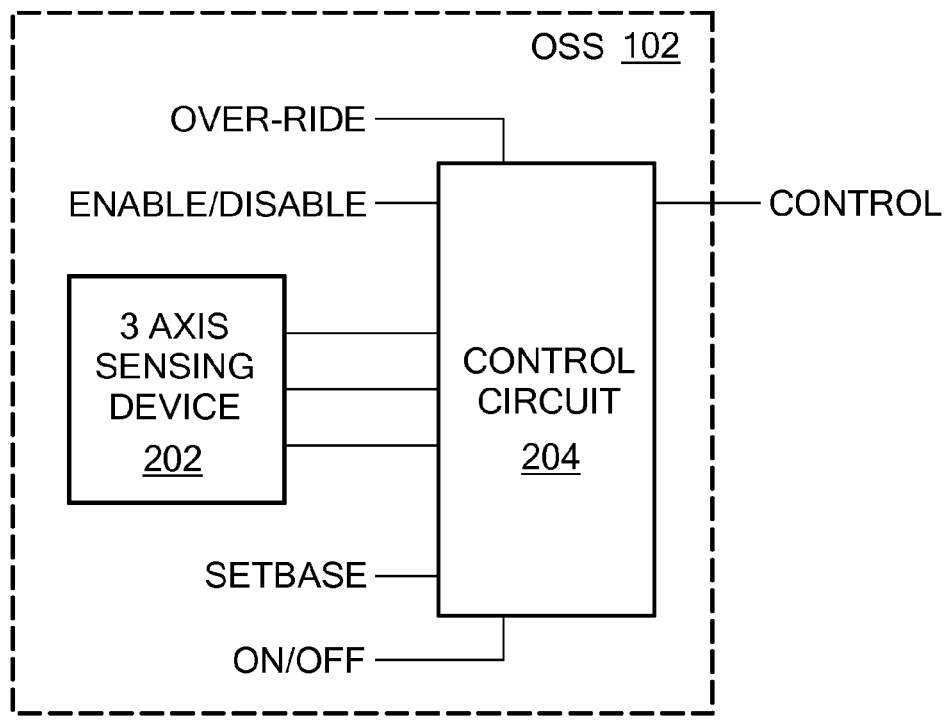
FIG. 2 is a block diagram of an orientation sensing system in accordance with one embodiment of the present invention.

In one embodiment of the present invention, the sensing module 102 includes a three axis sensing device 202 coupled to a control circuit 204, as shown in FIG. 2. The sensing device 202 may be a small, low-power three axis accelerometer such as the ADXL335 device available from Analog Devices of Norwood, Mass. The sensing device 202 measures the static acceleration of gravity to provide tilt-sensing as well as the detection of dynamic acceleration resulting from motion, shock, vibration, etc. One of ordinary skill will understand that there are other type of devices that measure tilt angle or acceleration. These include, but are not limited to, a mercury switch, a piezoelectric device, a laser device, an acoustic device and a gyroscope, either laser-based or mechanical.

The control circuit 204 receives the output signals from the sensing device 202 and processes these signals to provide a CONTROL signal to, for example, the UPS 104. In addition, the control circuit 204 receives a DISABLE signal that can be used to shut down the operation of the control circuit 204 such that operation of the system will continue irrespective of a change in orientation. An OVER-RIDE signal may also be provided to the control circuit 204 in order to "force" a change in operation although there may not be a change in orientation.

The control circuit 204 may also be able to set particular parameters, e.g., maximum tilt angles, forces, times, etc., as thresholds for determining when the detected orientation or force requires a change in operating status.

In one embodiment of the present invention, an uninterruptible power supply (UPS) is provided in a vehicle. The UPS is provided with circuitry to monitor the orientation of, and forces on, a vehicle and/or the UPS itself, e.g., the UPS's orientation separate from the orientation of the vehicle, such that the power output can be either modified or eliminated depending upon the detected orientation condition.

The UPS may be ruggedized in that it is built to withstand the conditions found in harsh environments, e.g., extreme heat, extreme cold, humidity, dust, rain, etc. The UPS may be built in compliance with a U.S. Military specification such as MIL-STD-810 or any other government or commercial standard of ruggedness.

Figure 3:
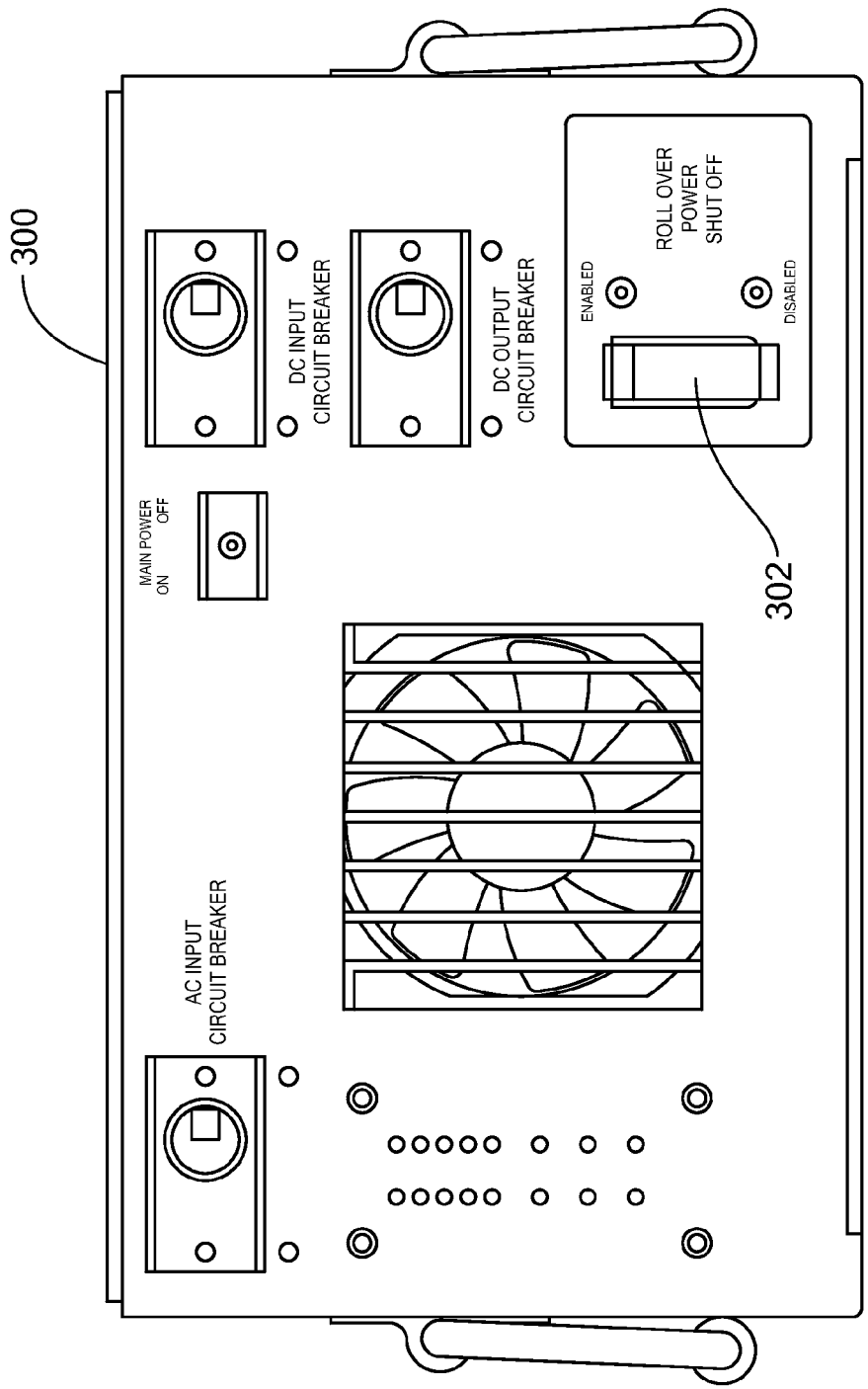
FIG. 3 is an uninterruptible power supply in accordance with one embodiment of the present invention.

It should be noted that the sensing module 102 need not be external to the UPS 104 and could be incorporated into the UPS 104. As shown in FIG. 3, an uninterruptible power supply 300 is shown in which an orientation detection function, i.e., "ROLL OVER POWER SHUT OFF," is provided. A switch 302 is used to enable or disable the rollover detection functionality. While the switch 302 is shown directly on the UPS 300, it is understood that the switch 302 and any other visual indicators could be mounted in a location visible to a user and not directly on the UPS 300 itself. This would allow for positioning of the UPS 300 where necessary and provide for ease of access to the controls. Of course, the connection from the remotely mounted switch and indicators may need to be ruggedized in order to provide proper operation under the expected worst-case conditions.

Figure 4:
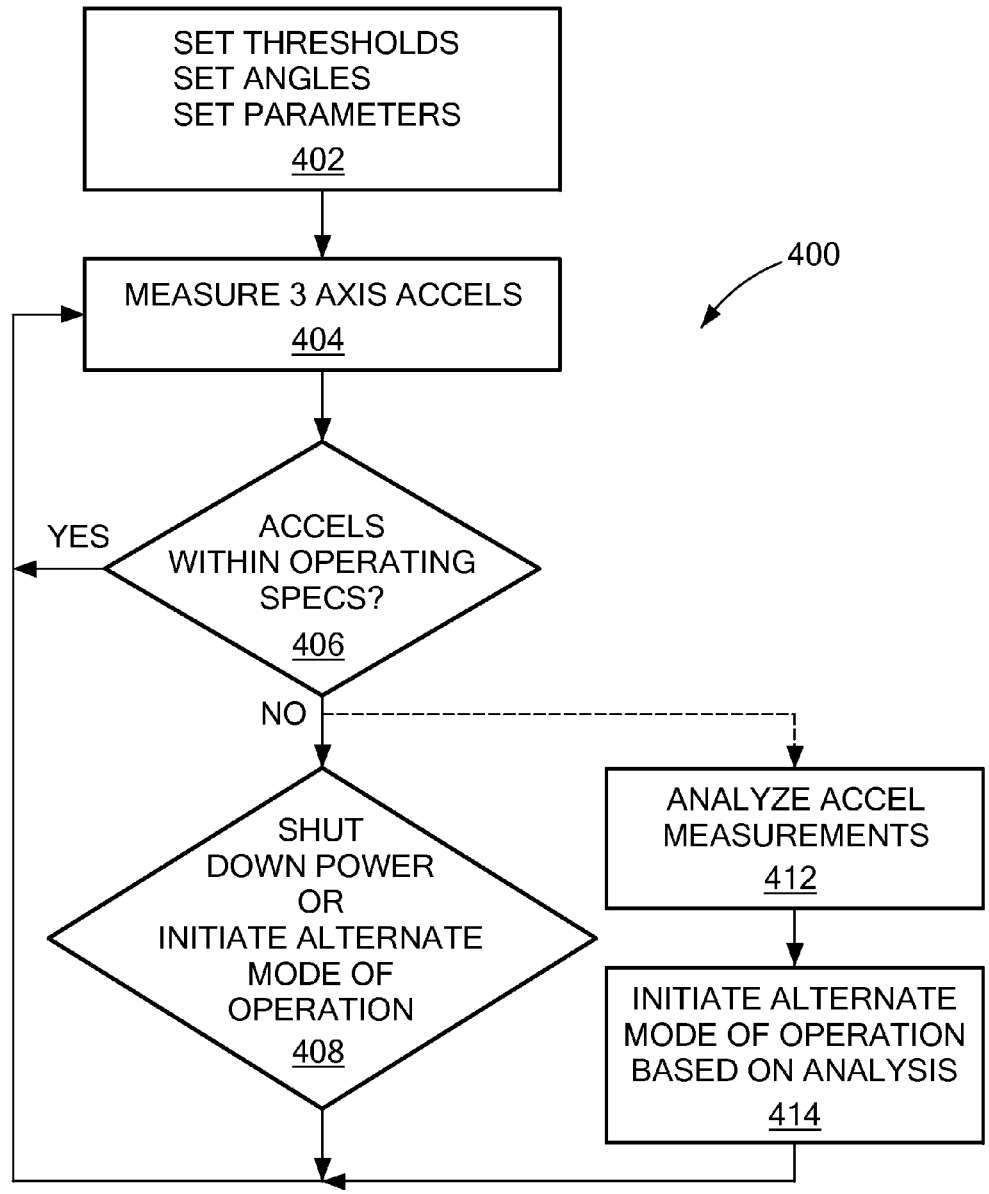
FIG. 4 is a method in accordance with one embodiment of the present invention.

Referring now to FIG. 4, a method 400 in accordance with one embodiment of the present invention begins at Step 402 with the setting of thresholds, angles, time periods, etc., that define the desired orientation or, alternatively, define the undesired orientation, and force parameters, i.e., the "setpoints," being entered into the system. Subsequently, Step 404, the accelerations and/or tilt angle in the three axes is measured. At step 406, it is determined whether or not the measured accelerations or tilt angles are within the operating specifications. If so, control returns to Step 404, otherwise control passes, in one embodiment, to Step 408 where the power is shut down or an alternate mode of operation is initiated. This alternate mode of operation may involve operating at less than full output power or operating in a mode that is a function of the present orientation or force condition.

In an alternate mode of operation, subsequent to the determination in Step 406 that the accelerations or tilt angles are indicative of a changed orientation or force condition, the measurements may be analyzed in Step 412 to better determine the present operating condition. In response to the analyzed measurements of Step 412, an alternate mode of operation based on this analysis may be initiated in Step 414 such as, for example, operating at less than full power for a predetermined time and then reevaluating the present operating condition to determine whether further changes are needed.

In one embodiment of the present invention, the control circuit 204 may include circuitry to filter out spurious shocks and vibrations in order to minimize the occurrence of "false" reports of altered orientation or excessive shocks. Further, the system may be provided with the capability to determine that an angle of operation, or tilt angle, has been detected for a predetermined period of time that might indicate a continuing operating condition and, therefore, necessitate a change in operating status, i.e., either a modification of operation or a shutting down of, for example, the power supply.

Still further, while embodiments of the present invention, as described above, include modifying the operating status or parameters of an uninterruptible power supply, the detection of a dangerous orientation as a result of an external force or shock could also result in a change in operation of a device other than the uninterruptible power supply described above. In one non-limiting example, the detected orientation may cause the cessation of one type of transmitted signal and the initiation of a transmission of a second type of transmitted signal.

In an alternate embodiment of the present invention, once a change in orientation has caused a modification of the operation of, for example, the UPS, a return to "normal" orientation may result in a return to "normal" operation. Thus, the detection of the orientation may continue even if the output of the UPS has been shut down or if the UPS has been turned off. In some instances, this may require a RESET signal being applied to the UPS, if the UPS was shut down, or it may require that control signals be directed to the UPS instructing the UPS to return to normal operation.

In yet another embodiment, the device being controlled may have multiple portions or functions, only some of which are to be altered in response to a detected orientation or shock. Thus, for example, in a situation where a UPS has multiple outputs, only one output connected to a particular device may be altered, or shut off completely, in response to the detection of a shock, force or orientation event. Thus, other portions of the UPS may continue to operate. Still further, some of the other outputs may be altered or shut down depending upon the devices that are connected.

For those UPS systems with separate outputs, each may have its own respective set of parameters to which a response is defined. Thus, in the example of a UPS with multiple outputs, an orientation of the UPS at a first tilt angle, or in response to a force of a first value, may only affect one output and not another. Further, there may be an Over-ride or Enable function separately provided for each output.

In addition, a user may be provided with an opportunity to delay or prevent either a shutting down or a change in operating status due to a detected tilt angle or shock event. In one non-limiting example, a UPS within a vehicle may be provided with the tilt angle and/or shock detection system described herein. A panel display visible to an occupant of the vehicle, either the driver or co-pilot, including an indicator, e.g., either a touch-screen interface or a set of lights and switches, is provided. When the UPS is about to change its status in response to an event, the user may be given the opportunity to either, for example, ignore the notification and let the change occur, operate the interface or switch to prevent the change, cause the change to be implemented immediately if there is a delay built in, or alter the operation of the system in some other manner.

The control circuit 204 may be implemented using discrete components in order to process the input signals from the sensing device 202 and the conditions of the input controls. Alternatively, the control circuit 204 may include a microprocessor and associated devices, for example, memory, input/output devices, etc., to process the output from the sensing device 202, as well as the input controls, in order to determine the necessary response to the changed orientation. The control circuit 204 may be powered from a source separate from the UPS and the vehicle and may have, for example, battery backup capabilities.

Still further, embodiments of the present invention may include both a microprocessor-based system as well as a discrete device-based system. Such a "dual" system may provide redundancy when it is considered that the orientation system may need to continue to operate and control the UPS, or such other device or devices, upon occurrence of a shock, or tilt angle, that exceeds the expected operating conditions.

Having thus described several features of at least one embodiment of the present invention, it is to be appreciated that various other alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A system for mounting within a vehicle comprising:
    an uninterruptible power supply (UPS) operable to receive input power at least at some times and to produce a first output in response to the received input power, said UPS operable to continue to produce the first output in the absence of the input power; and
    a detector coupled to the UPS, the detector operable to detect at least one situation parameter associated with at least one of the vehicle and the UPS, wherein the at least one situation parameter is at least one of:
        an incline angle relative to a reference plane,
        an applied force,
        an acceleration, and
        a vibration,
    wherein the UPS is operative to modify the first output as a function of the detected at least one situation parameter.

2. The system of claim 1, wherein the UPS is operative to modify the first output as a function of the detected at least one situation parameter and one or more of:
    a first predetermined parameter threshold value;
    a first predetermined range of parameter values;
    a time duration the detected at least one situation parameter is within the first predetermined range of parameter values; and
    a time duration the detected at least one situation parameter exceeds the first predetermined parameter threshold value.

3. The system of claim 1, wherein the detected at least one situation parameter is an incline angle relative to a reference plane and the UPS is operative to modify the first output as a function of the detected incline angle and one or more of:
    a first predetermined inclination threshold value;
    a first predetermined range of inclination values;
    a time duration the detected incline angle is within the first predetermined range of inclination values; and
    a time duration the detected incline angle exceeds the first predetermined inclination threshold value.

4. The system of claim 1, including at least one transmitter, wherein the UPS is operative to cause the cessation of a transmission of a first type of transmitted signal from the at least one transmitter and to initiate transmission of a second type of transmitted signal from the at least one transmitter, wherein the first and second types of transmitted signal are different from one another.

5. The system of claim 4, wherein the UPS is configured to transmit only the first or the second type of transmitted signal at any given time.

6. The system of claim 1, wherein the at least one situation parameter is an incline angle relative to a reference plane and the UPS is further operative to turn off the first output when the detected incline angle bears a first predetermined relation to a first predetermined threshold value and to turn on the first output when the detected incline angle bears a second predetermined relation to the first predetermined threshold value.

7. The system of claim 1, wherein the UPS is operative to produce a second output in response to the receipt of the input power at least at some times, the UPS operable to continue to produce the second output in the absence of the input power, wherein the UPS is further operative to modify the second output as a function of the detected at least one situation parameter.

8. The system of claim 7, wherein the UPS is further operative to modify the second output in a manner different from the modification of the first output.

9. The system of claim 7, wherein the at least one situation parameter is an incline angle relative to a reference plane and the UPS is further operative to:
    turn off the second output when the detected incline angle bears a first predetermined relation to a first predetermined threshold value; and
    turn on the second output when the detected incline angle bears a second predetermined relation with respect to the first predetermined threshold value.

10. The system of claim 1, further comprising:
    a control circuit coupled to the UPS and the detector, the control circuit operable to generate a control signal as a function of the detected at least one situation parameter and to provide the control signal to the UPS,
    wherein the UPS is further operable to modify the first output in response to the control signal received from the control circuit.

11. A method of operating an uninterruptible power supply (UPS) mounted within a vehicle, the method comprising:
    receiving input power at the UPS at least at some times and producing a first output in response to the received input power, said UPS operable to continue to produce the first output in the absence of the input power;
    detecting at least one situation parameter associated with at least one of the vehicle and the UPS, wherein the at least one situation parameter is an incline angle relative to a reference plane, an applied force, an acceleration or a vibration; and
    modifying the first output of the UPS as a function of the detected at least one situation parameter.

12. The method of claim 11, further comprising:
    modifying the first output as a function of the detected situation parameter and one or more of:
        a first predetermined parameter threshold value;
        a first predetermined range of parameter values;

a time duration the detected situation parameter is within the first predetermined range of parameter values; and a time duration the detected situation parameter exceeds the first predetermined parameter threshold value.

13. The method of claim 11, wherein the at least one situation parameter is an incline angle relative to a reference plane, the method further comprising:

modifying the first output as a function of the detected incline angle and one or more of:

a first predetermined inclination threshold value;

a first predetermined range of inclination values;

a time duration the detected incline angle is within the first predetermined range of inclination values; and a time duration the detected incline angle exceeds the first predetermined inclination threshold value.

14. The method of claim 11, further comprising:

ceasing a transmission of a first type of transmitted signal; and initiating a transmission of a second type of transmitted signal, wherein the first and second types of transmitted signals are different from one another.

15. The method of claim 14, further comprising:

transmitting only the first or the second type of transmitted signal at any given time.

16. The method of claim 11, wherein the at least one situation parameter is an incline angle relative to a reference plane, the method further comprising:

turning off the first output of the UPS when the detected incline angle bears a first predetermined relation to a first predetermined threshold value; and turning on the first output of the UPS when the detected incline angle bears a second predetermined relation to the first predetermined threshold value.

17. The method of claim 11, further comprising:

operating the UPS to produce a second output in response to the received input power at least at some times; and modifying the second output as a function of the detected at least one situation parameter.

18. The method of claim 17, further comprising:

modifying the second output in a manner different from the modification of the first output.

19. The method of claim 17, further comprising:

turning off the second output when the detected incline angle bears a first predetermined relation to a first predetermined threshold value; and turning on the second output when the detected incline angle bears a second predetermined relation with respect to the first predetermined threshold value.

20. The method of claim 11, further comprising:

generating a control signal as a function of the detected at least one situation parameter;

providing the control signal to the UPS; and modifying the first output in response to the control signal.

* * * * *